United States Patent
Spencer

(10) Patent No.: US 6,301,036 B1
(45) Date of Patent: Oct. 9, 2001

(54) OPTICAL SIGNAL TRANSMISSION NETWORK WITH FIBER-BREAK DETECTION

(75) Inventor: Geoffrey Spencer, Cape Town (ZA)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/091,489

(22) PCT Filed: Dec. 19, 1996

(86) PCT No.: PCT/GB96/03145

§ 371 Date: Sep. 11, 1998

§ 102(e) Date: Sep. 11, 1998

(87) PCT Pub. No.: WO97/23965

PCT Pub. Date: Jul. 3, 1997

(30) Foreign Application Priority Data

Dec. 21, 1995 (GB) .................................... 9526185

(51) Int. Cl.[7] .......................... H04B 10/16; H04B 10/02; H04B 10/08
(52) U.S. Cl. ........................ 359/179; 359/177; 359/130; 359/110
(58) Field of Search .................... 359/110, 177, 359/173, 179, 130

(56) References Cited

U.S. PATENT DOCUMENTS

| | | | |
|---|---|---|---|
| 5,319,482 | * 6/1994 | Tsuchiya | 359/110 |
| 5,436,746 | * 7/1995 | Hirst | 359/110 |
| 5,532,864 | * 7/1996 | Alexander et al. | 359/177 |
| 5,633,741 | * 5/1997 | Giles | 359/124 |
| 6,075,628 | * 6/2000 | Fisher et al. | 359/110 |

FOREIGN PATENT DOCUMENTS

| | | | |
|---|---|---|---|
| 0 111 582 A1 | 6/1984 | (EP) . | |
| 0 390 320 A2 | 10/1990 | (EP) . | |
| 619657 A1 | * 10/1994 | (EP) | 359/110 |
| 2 267 792 A | 12/1993 | (GB) . | |
| 0074835 A | * 3/1989 | (JP) | 359/110 |
| 0002228 A | * 1/1990 | (JP) | 359/110 |
| 0094830 A | * 4/1990 | (JP) | 359/110 |
| 402264527 A | * 10/1990 | (JP) | 359/110 |
| 0013018 A | * 1/1991 | (JP) | 359/110 |
| 403258037 A | * 11/1991 | (JP) | 359/110 |
| 404097629 A | * 3/1992 | (JP) | 359/110 |
| 405336042 A | * 12/1993 | (JP) | 359/110 |
| 406232817 A | * 8/1994 | (JP) | 359/110 |

\* cited by examiner

Primary Examiner—Leslie Pascal
Assistant Examiner—Christina Y Leung
(74) Attorney, Agent, or Firm—Ware, Fressola, Van Der Sluys & Adolphson LLP

(57) ABSTRACT

A bi-directional optical signal transmission network comprises an outbound (12) and an inbound (14) fibre each including an optical amplifier/repeater (18/24). An optical coupling (30, 38, 40) communicates between one of the fibres (12) to the output side of the amplifier/repeater (18) and the other fibre (14). The coupling includes a filter (40) which is arranged to permit transfer of a test signal wavelength between the outbound (12) and the inbound (14) fibre but which prevents transfer of unwanted traffic signal.

20 Claims, 3 Drawing Sheets

OPTICAL SIGNAL TRANSMISSION NETWORK WITH FIBER-BREAK DETECTION

BACKGROUND OF INVENTION

This invention relates to fibre break detection in optical signal transmission networks and more particularly to such networks employing optical amplifiers.

Optical fibre break detection is well known in which a signal is sent from one end of the fibre, is reflected from the break back to the sending end and used to determine the break position as a function of the time delay between sending and receiving back the signal. Such a system is known as Optical Time Domain Reflectometry (OTDR). In the case of long haul optical transmission networks it is necessary to employ one or more amplifier/repeater in order to compensate for signal degradation which occurs with increasing distance along the fibre. The amplifier/repeater in such a system are unidirectional and this prevents the use of conventional OTDR launching a probe pulse and detecting the backscattered signal on the same fibre.

Long haul amplified/repeated optical transmission systems normally employ pairs of fibres one for outbound signals and one for inbound signals each having unidirectional amplifier/repeaters and various optical coupler arrangements have been proposed which are intended to facilitate OTDR in such systems. Some arrangements known to us are described in:
(1) Novel Coherent Optical Time Domain Reflectometry For Fault Localisation of Optical Amplifier Submarine Cable Systems. Yukio Horiuchi et al.—KDD Laboratories IEEE Photonics Technology Letters, Vol.2, No. 4 April 1990.
(2) Fault Location on Optical Amplifier Submarine Systems Masatoyo Sumida et al.—NTT Transmission Systems Laboratories IMTC, 10 May 1994, 0-7803-1880-3/94 IEEE.

Another fault detection arrangement is disclosed in European Patent Specification Number EP-A-0 111 582 in which an optical link having an outbound and inbound fibre comprises a concatenated series of optical couplers between the fibres each turned to a different test signal wavelength. The test signal employs several different wavelengths and each outgoing test signal wavelength on the outbound fibre is coupled back along the inbound fibre by a different one of the couplers. In this way the absence of a particular returned test signal wavelength is indicative of a fault in the fibre between a particular pair of couplers. This is an imprecise indication and does not permit the exact location of the break to be determined by time domain reflectometry.

Another fault detection arrangement is disclosed in British Patent Specification Number GB 2267 792A discloses a bidirectional optical transmission system in which outbound and inbound fibres are coupled by optical dividers to permit part of a reflected test signal to be coupled between the fibres to permit fault location by OTDR techniques. The coupling causes degradation of traffic signals due to the coupling and permits transfer of traffic signals as well as test signals between the two fibres. The coupling factor has to be sufficiently small to prevent significant degradation of the traffic signals and this results in low sensitivity of detection of OTDR due to low levels of test signal transferred.

There are disadvantages with all the previously mentioned known arrangements and the present invention seeks to provide an improvement over such arrangements.

SUMMARY OF INVENTION

According to the invention there is provided a bi-directional optical signal transmission network, comprising an outbound (12) and an inbound (14) fibre each including an optical amplifier/repeater (18/24), optical coupling means (30,38,40) communicating between one of the fibres (12), to the output side of the amplifier/repeater (18) and the other fibre (14) characterised in a filter (40) which is arranged to prevent transfer between the outbound and the inbound fibre of a traffic signal and an outbound test signal wavelength but which permits transfer of a test signal after reflection back along the outbound fibre.

The network may comprise an additional optical coupling means communicating between said other fibre, to the output side of the amplifier/repeater, and said one of the fibres and including a second filter which is arranged to permit transfer of a test signal wavelength between the inbound and outbound fibre but which prevents transfer of a unwanted traffic signal.

The or each coupling means may comprise an optical fibre including a transmission filter which permits passage of the test signal wavelength but which prevents transfer of the wanted traffic signal, which coupling means is provided at each end with a tap coupler to a different one of the inbound and outbound fibres.

The or each coupling means may comprise an optical fibre including a transmission filter which permits passage of the test signal wavelength but which prevents transfer of the wanted traffic signal, which coupling means comprises one end with a 3 port circulator having input and output ports for the outbound fibre and an intermediate port coupled with the fibre of the coupling means and at the other end a tap coupler to the inbound fibre.

The or each coupling means may comprise an optical fibre including a transmission filter which permits passage of the test signal wavelength but which prevents transfer of the wanted traffic signal, which coupling means comprises at each end a 3 port circulator one for each of the outbound and inbound fibres each circulator having an input and output port for their particular outbound or inbound fibre and another port coupled with the fibre of the coupling means.

The or each coupling means may comprise an optical fibre, a four port circulator, a tap couple r and a reflection filter which reflects the test signal wavelength but not traffic signals, the four port circulator having its ports one to four in the circulating direction coupled one to the outbound fibre from the amplifier/repeater, two to the continuation of the outbound fibre three to the reflection filter and four to one end of the optical fibre of the coupling means whilst the tap coupler is coupled via the other end of the optical fibre of the coupling means to the inbound fibre.

The or each coupling means may comprise an optical fibre, a four port circulator, a three port circulator and a reflection filter which reflects the test signal wave length but not the traffic signals, the four port circulator having ports one to four in the circulating direction coupled one to the outbound fibre from the amplifier/repeater, two to the continuation of the outbound fibre, three to the reflection filter and four to one end of the optical fibre of the coupling means, the three port circulator having its ports one to three in the circulating direction coupled one to the inbound fibre two to the other end of the optical fibre of the coupling means and three to the continuation of the inbound fibre.

The or each coupling means may comprise an optical fibre two three port circulators and a reflection filter which reflects the test signal wavelength but not the traffic signals, the first three port circulator having its ports one to three in the circulating direction coupled one to the outbound fibre from the amplifier/repeater, two to the continuation of the outbound fibre, and three to one end of the fibre of the coupling means, the second three port circulator having its ports one to three in the circulating direction coupled one to the other end of the fibre of the couplings two to the inbound fibre and three to the continuation of the inbound fibre whilst the reflection filter is connected in the inbound fibre prior to port one of the second three port circulator.

The or at least one of the coupling means may communicate with the inbound fibre to the input side of its associated optical amplifier/repeater.

The or at least one of the coupling means may communicate with the inbound fibre to the output side of its associates optical amplifier/repeater.

The inbound and outbound fibres may extend under water between spaced land masses and the transmission/reception equipment is located on the land masses.

The network may include an optical time domain reflectometer having means for generating the test wavelength different to the traffic signal wavelength on the outbound fibre, for receiving that wavelength from the inbound fibre after reflection and for determining the location of a break as a function of time delay between outgoing and incoming test wavelength signals.

According to another aspect of the invention there is provided method of fibre break detection in an optical fibre bidirectional transmission system having amplifiers/repeaters comprising the steps of: transmitting on an outbound fibre a test wavelength different from the wavelength of traffic signals, coupling the reflected test wavelength from the outbound line to the inbound line via a filter which permits transfer of the test signal wavelength after reflection but not the outgoing traffic signal or test wavelength and comparing the time delay between transmitted and returned test wavelength signals, and determining the location of a break as a function of the time delay.

In order that the invention and its various other preferred features may be understood more easily, some embodiments thereof will now be described, by way of example only, with reference to the drawings, therefor

DETAILED DESCRIPTION OF INVENTION

Figure 1:
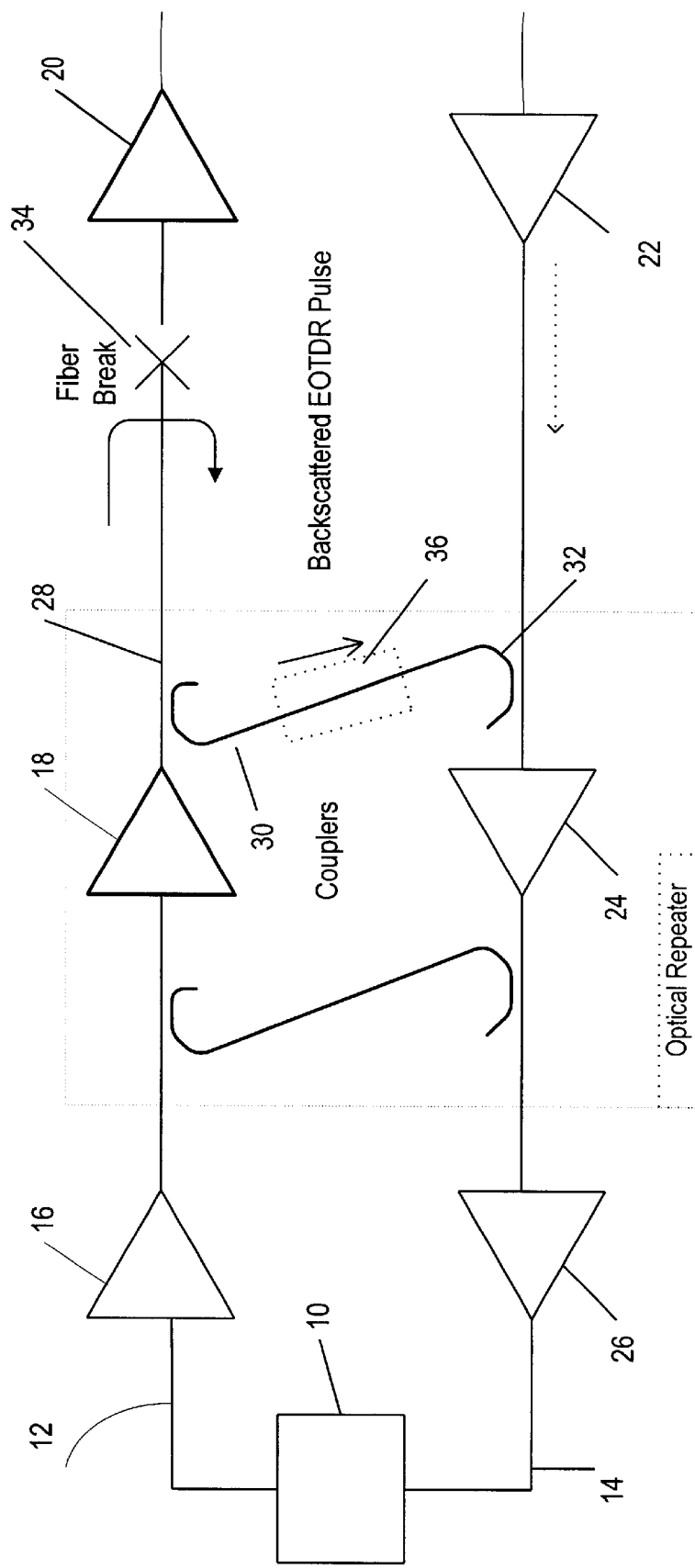
FIG. 1 is a prior art OTDR network system.

Referring now to FIG. 1 there is shown a prior art bidirectional long haul optical transmission system such as is described in reference 1 previously referred to. In this system a transmitter/receiver terminal 10 is coupled to an outbound fibre 12 for transmission signals and an inbound fibre 14 for receiving signals. The terminal 10 has the capability of providing a specific wavelength signal for OTDR purposes on the outbound fibre. The outbound and inbound fibres are routed via optical amplifiers/repeaters 16, 18, 20, 22, 24, 26 three of which are shown in each line. An optical directional coupler 28 is provided following amplifier/repeater 18 of the outbound line and is arranged to tap a proportion of the optical signal from the line, The coupler is coupled via a fibre 30 to the inbound line at the input to amplifier/repeater 24 via a second directional coupler 32. A break in the outbound line is shown at 34. In use, to detect the break, a test signal is sent from terminal 10 and the outbound fibre 12 is reflected or backscattered by the break coupled via the coupler 28, fibre 30 and coupler 32 to the inbound line back to the terminal 10 where the break location is determined by OTDR.

There are however some fundamental limitations imposed by such a coupler arrangement. In order to maintain a low loss path/repeaters for the main traffic signal at the outputs and/or inputs of the amplifiers/repeaters low coupling ratios for the backscattered light must be used which reduces the backscattered signal, and hence the performance of the fiber-break detection system. Furthermore, extra loss may have to be inserted in the backscatter path via an attenuator 36 to reduce the penalty to the inbound return line traffic signal caused by the backscattered outbound line signal. This further limits break detection capability.

The invention has been arrived at from consideration of the requirements for OTDR in such systems. The method of transferring the backscattered OTDR probe signal from the outbound to the inbound fibre may be viewed in two parts: Extracting the backscattered signal from the outbound fibre, and adding it to the inbound fiber. Furthermore this should be done with minimal effect on the magnitude of the traffic signals.

The invention and its various other preferred features will now be described by reference to the further diagrams which illustrate modifications of the arrangement illustrated in FIG. 1 with only the modified portion being illustrated. The same reference numerals are employed to identify the same parts of FIG. 1.

Figure 2:
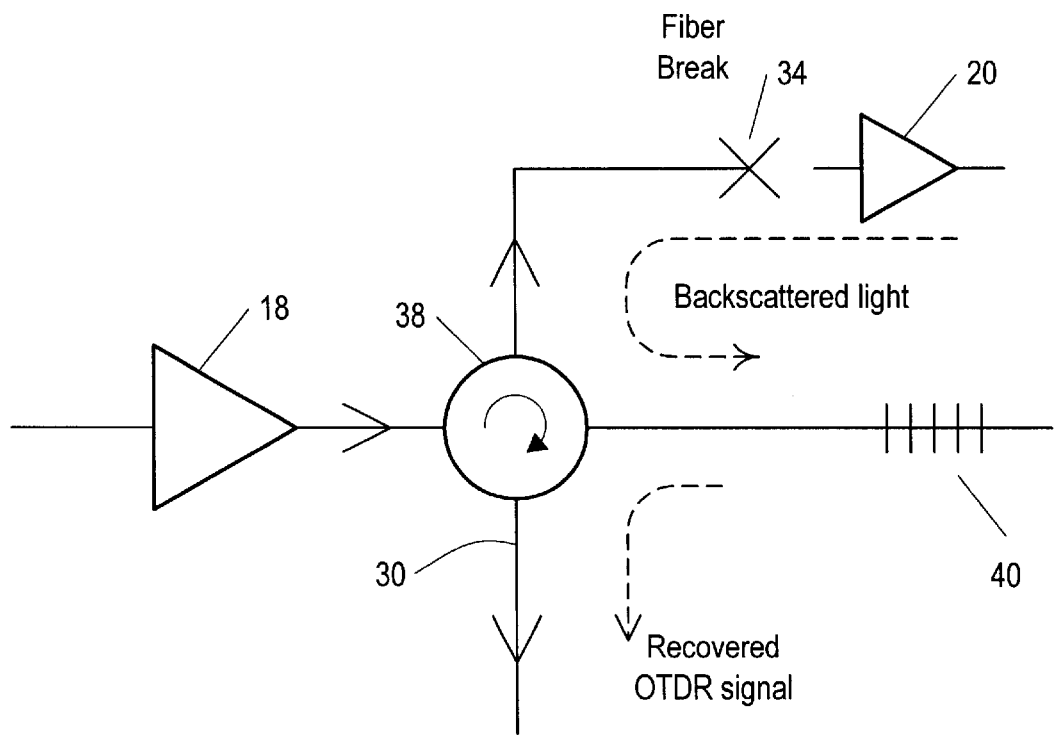
FIG. 2 illustrates schematically a modification of part of the system of FIG. 1 to provide a network constructed in accordance with the invention.

In FIG. 2, instead of employing an optical coupler at the output of the amplifier there is provided an optical circulator 38 and a reflection filter 40 which is designed to reflect the OTDR wavelength. As will be seen the output of the amplifier is connected to a first port of the circulator, the second port of the circulator is coupled to the output line and on to the amplifier 20, the third port is coupled to the reflection filter 40 and the fourth port is coupled to the cross connection fibre 38. In use, a traffic and/or test signal sent along the outbound fibre 12 enters the circulator 38 at the first port and passes out through the second port for onward routing to the amplifier 20. As a result of a break at 34 backscattered light which comprises traffic and/or test signals is routed back to the second port of the circulator 38 out through the third port to the reflection filter 40 where the traffic signal is absorbed and the test signal reflected back to the third port of the circulator and out from the fourth port onto the fibre 30 for cross coupling to the inbound line at the input to the amplifier/repeater 24. The line traffic signal and OTDR probe signals are required to be of different wavelengths, so that the filter reflects only the required OTDR test wavelength. The filter may be of any suitable reflection type e.g. a fiber Bragg Grating.

Figure 3:
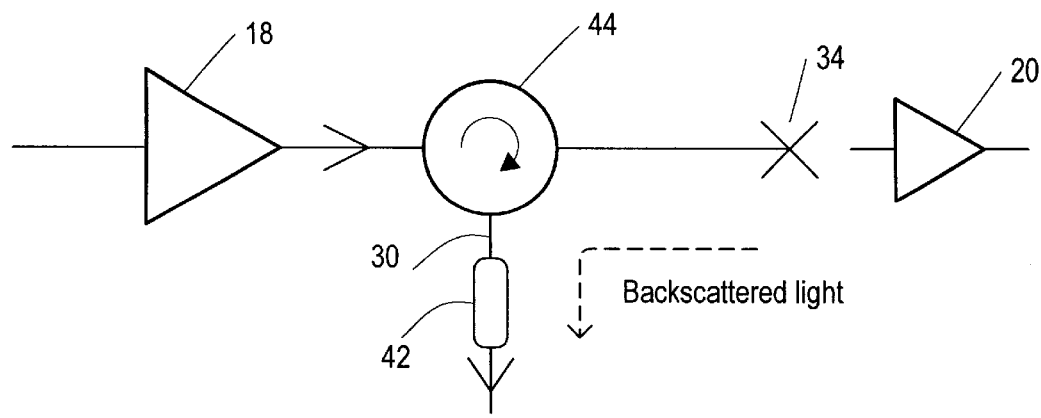
FIG. 3 illustrates schematically an alternative modification of part of the system of FIG. 1 to provide a network constructed in accordance with the invention.

FIG. 3 illustrates an alternative arrangement employing a transmission filter 42 designed to pass the OTDR test signal wavelength but not the traffic wavelength. In this arrangement a three port optical circulator 44 is employed. The output of the amplifier 18 is coupled to the first port of the optical circulator, the second port is coupled to the output line and on to the amplifier 20 and the third port is coupled via the cross connection fibre 30 to the filter 42. In use a traffic and/or test signal is sent along the outbound fibre 20 enters the circulator 44 at the first port and passes out through the second port for onward routing to the amplifier 20. As a result of a break at 34 backscattered light which comprises traffic and/or test signals is routed back to the second port of the circulator and out through the third port onto the fibre 30 to the filter 42 which permits passage of the test signal wavelength but which prevents passage of the traffic signal wavelength which is then coupled to the inbound line at the input to the amplifier/repeater 24.

In the arrangement of FIG. 3, instead of employing a three port circulator an optical coupler such as shown as 28 in FIG. 1, may be employed although this is less advantageous because the coupling factor employed is a trade off between permitting transfer of the returning test signal whilst permitting adequate transmission of the traffic signal.

The coupling of the returning backscattered signal on the line 30 after filtering can be effected by a simple optical coupler 32 in the manner illustrated in FIG. 1. However, even if this is a relatively high ratio tap coupler there will be attenuation of the test signal. A preferred arrangement is to employ a three port circulator such as 46 shown in FIG. 4. Here the line 30 is coupled to the first port of the circulator, the return line from the amplifier 22 is coupled via a reflection filter to the second port, which reflection filter is arranged to pass the signal wavelength but reflect the test wavelength, and the third port is coupled to the input of the amplifier 24. In use, a backscattered test signal arriving on the line 30 enters the first port of the circulator, exits the second port but is reflected back to the circulator by the filter 48, exits the third port for onward transmission back to the transmit/receiver terminal 16 via the amplifier 24. A traffic signal arriving on the inbound fibre from the amplifier 22 passes through the reflection filter 48 into the second port or the circulator 46, out through the third port and onward to the transmit/receive terminal 16 via the amplifier/repeater 24.

Figure 4:
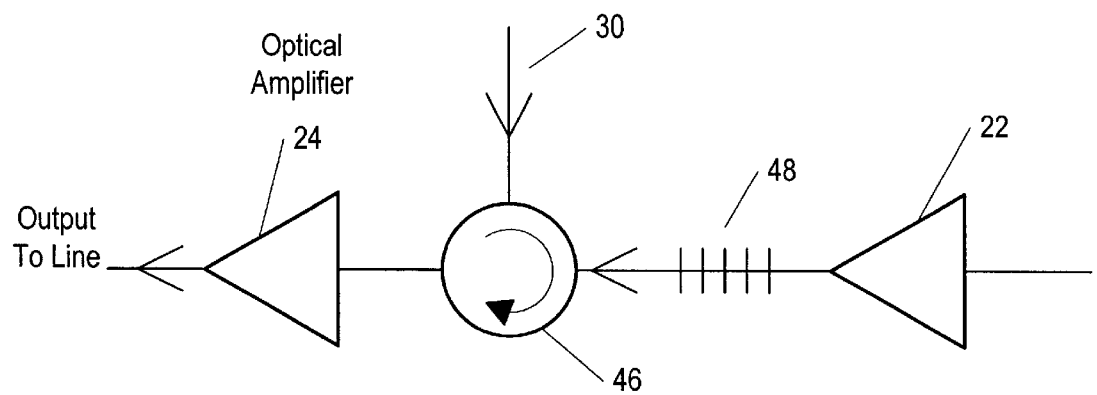
FIG. 4 illustrates schematically yet another alternative modification applicable to the systems of FIGS. 1, 2 or 3 to provide a network constructed in accordance with the invention.

With the arrangement of FIG. 4 employed with the arrangement of FIG. 3 the transmission filter 42 may be dispensed with as the reflection filter 48 will not permit reflection of the backscattered traffic signal. The loss of the backscatter path is reduced by the use of a circulator rather than a high ratio tap coupler. This considerably increases the span length that can be measured by the OTDR system.

The line transmission penalty on the inbound fiber is minimised by the use of a filter to ensure that only the narrow band around the OTDR probe wavelength is coupled back to the return fiber. The circulator acts as an output isolator for the amplifier, which is required anyway, so the number of extra components required to implement the OTDR function is minimised.

Whilst any suitable reflection filter can be used for the components 40, 48 a Bragg Grating is particularly suitable. Any suitable transmission filter can be employed for the filter 42 for example a multi layer dielectric filter or a Fabre Perot filter.

Although the embodiments illustrated and described employ cross coupling between the output of an amplifier/repeater in one path and the input of an amplifier/repeater in the other path, which is the preferred arrangement, the coupling may be effected between the output of the amplifier/repeater in one path and the output of an amplifier/repeater in the other path.

For ease of description coupling of a signal from the outgoing fibre to the incoming path is described. It will be appreciated that similar coupling arrangements can be provided between the incoming fibre and the outgoing fibre for OTDR interrogation from the terminal at the opposite end of the system. Such a coupling is schematically illustrated in FIG. 1 between the output of the amplifier 24 and the input 18 and similar couplings to those described in connection with FIGS. 2 to 4 can be employed without departing from the scope of the present invention.

Whilst for simplicity of description cross coupling just between the amplifier/repeaters 18 and 24 are illustrated and described. However, it will be appreciated that similar cross couplings can be provided between other amplifiers/repeaters or all of the amplifiers/repeaters such as 16, 26 & 20, 22 can be employed. Such arrangements are considered to fall within the scope of this invention.

What is claimed is:

1. A bi-directional optical signal transmission network, comprising an outbound fibre and an inbound fibre each including a respective optical amplifier/repeater, first optical coupling means communicating between the outbound fibre to the output side of the amplifier/repeater of the outbound fibre, and the inbound fibre, wherein the first optical coupling means includes a filter which is arranged to prevent transfer between the outbound fibre and the inbound fibre of a traffic signal and an outbound test signal wavelength but which permits transfer of a test signal after reflection back along the outbound fibre.

2. A network as claimed in claim 1, comprising an additional optical coupling means communicating between said inbound fibre, to the output side of the amplifier/repeater of the inbound fibre, and said outbound fibre and including a second filter which is arranged to permit transfer of a test signal wavelength between the inbound and outbound fibre but which prevents transfer of a unwanted traffic signal.

3. A network as claimed in claim 1, wherein the first optical coupling means comprises an optical fibre including a transmission filter which permits passage of the test signal wavelength but which prevents transfer of the unwanted traffic signal, which first optical coupling means is provided at each end with a tap coupler to a different one of the inbound fibre and outbound fibre.

4. A network as claimed in claim 1, wherein the first optical coupling means comprises an optical fibre including a transmission filter which permits passage of the test signal wavelength but which prevents transfer of the unwanted traffic signal, which first optical coupling means comprises one end with a 3 port circulator having input and output ports for the outbound fibre and an intermediate port coupled with the fibre of the first optical coupling means and at the other end a tap coupler to the inbound fibre.

5. A network as claimed in claim 1, wherein the first optical coupling means comprises an optical fibre including a transmission filter which permits passage of the test signal wavelength but which prevents transfer of the unwanted traffic signal, which coupling means comprises at each end a 3 port circulator one for each of the outbound fibre and inbound fibre, each circulator having an input and output port for their respective outbound or inbound fibre and another port coupled with the fibre of the first optical coupling means.

6. A network as claimed in claim 1, wherein the first optical coupling means comprises an optical fibre, a four part circulator, a tap coupler and a reflection filter which reflects the test signal wavelength but not traffic wavelengths, the four port circulator having its ports one to four in the circulating direction coupled port one to the outbound fibre from the amplifier/repeater of the outbound fibre, port two to the continuation of the outbound fibre, port three to the reflection filter (40) and port four to one end of the optical fibre of the first optical coupling means, and wherein the tap coupler is coupled via the other end of the optical fibre of the first optical coupling means to the inbound fibre.

7. A network as claimed in claim 1, wherein the first optical coupling means comprises an optical fibre, a four port circulator a three port circulator and a reflection filter which reflects the test signal wavelength but not the traffic signals, the four port circulator having ports one to four in the circulating direction coupled port one to the outbound fibre from the amplifier/repeater of the outbound fibre, port two to the continuation of the outbound fibre, port three to the reflection filter and port four to one end of the optical fibre of the first optical coupling means, and the three port circulator having its ports one to three in the circulating direction coupled port one to the inbound fibre port two to the other end of the optical fibre of the first optical coupling means and port three to the continuation of the inbound fibre.

8. A network as claimed in claim 1, wherein the first optical coupling means comprises an optical fibre, two three port circulators and a reflection filter which reflects the test signal wavelength but not the traffic signals, the first three port circulator having its ports one to three in the circulating direction coupled port one to the outbound fibre from the amplifier/repeater of the outbound fibre, port two to the continuation of the outbound fibre, and port three to one end of the fibre of the first optical coupling means, the second three port circulator having its ports one to three in the circulating direction coupled port one to the other end of the fibre of the first optical coupling means, port two to the inbound fibre and port three to the continuation of the inbound fibre whilst the reflection filter is connected in the inbound fibre prior to port one of the second three port circulator.

9. A network as claimed in claim 1, wherein the first optical coupling means communicates with the inbound fibre to the input side of its associated optical amplifier/repeater.

10. A network as claimed in claim 1, wherein the first optical coupling means communicates with the inbound fibre to the output side of its associated optical amplifier/repeater.

11. A network as claimed in claim 1, wherein the inbound and outbound fibres extend under water between spaced land masses and transmission/reception equipment for the bi-directional optical signal transmission network is located on the land masses.

12. A network as claimed in claim 1, including an optical time domain reflectometer having means for generating the test wavelength different to the traffic signal wavelength on the outbound fibre, for receiving that test wavelength from the inbound fibre after reflection and for determining the location of a break as a function of time delay between outgoing and incoming test wavelength signals.

13. A method of fibre break detection in an optical fibre bi-directional transmission system having amplifiers/repeaters comprising the steps of: transmitting on an outbound fibre a test wavelength different from the wavelength of traffic signals, coupling the reflected test wavelength from the outbound fibre to the inbound fibre, comparing the time delay between transmitted and returned test wavelength signals, and determining the location of a break as a function of the time delay, wherein the coupling from the outbound fibre to the inbound fibre is effected via a filter which permits transfer of the test signal wavelength after reflection but not the outgoing traffic signal or test wavelength.

14. A network as claimed in claim 2, wherein the first and additional optical coupling means each comprises an optical fibre including a transmission filter which permits passage of the test signal wavelength but which prevents transfer of the unwanted traffic signal, which first and additional optical coupling means is each provided at each end with a tap coupler to a different one of the inbound fibre and outbound fibre.

15. A network as claimed in claim 2, wherein the first and additional optical coupling means each comprises an optical fibre including a transmission filter which permits passage of the test signal wavelength but which prevents transfer of the unwanted traffic signal, which first and additional optical coupling means each comprises one end with a 3 port circulator having input and output ports for the fibre carry outbound traffic signals and an intermediate port coupled with the fibre of the respective optical coupling means and at the other end a tap coupler to the fibre carry inbound traffic signals.

16. A network as claimed in claim 2, wherein the first and additional optical coupling means each comprises an optical fibre including a transmission filter which permits passage of the test signal wavelength but which prevents transfer of the unwanted traffic signal, which optical coupling means comprises at each end a 3 port circulator, one for each of the outbound fibre and inbound fibre, each circulator having an input and output port for their respective outbound or inbound fibre and another port coupled with the fibre of the respective optical coupling means.

17. A network as claimed in claim 2, wherein the first and additional optical coupling means each comprises an optical fibre, a four part circulator, a tap coupler and a reflection filter which reflects the test signal wavelength but not traffic wavelengths, the four port circulator having its ports one to four in the circulating direction coupled port one to the fibre carrying outboard traffic signals from the amplifier/repeater, port two to the continuation of the fibre carrying outbound traffic signals, port three to the reflection filter and port four to one end of the optical fibre of the respective optical coupling means, and wherein the tap coupler is coupled via the other end of the optical fibre of the respective optical coupling means to the fibre carrying inbound traffic signals.

18. A network as claimed in claim 2, wherein the first and additional optical coupling means each comprises an optical fibre, a four port circulator, a three port circulator and a reflection filter which reflects the test signal wavelength but not the traffic signals, the four port circulator having ports one to four in the circulating direction coupled port one to the fibre carrying outbound traffic signals from the amplifier/repeater, port two to the continuation of the fibre carrying outbound traffic signals, port three to the reflection filter and port four to one end of the optical fibre of the respective optical coupling means, and the three port circulator having its ports one to three in the circulating direction coupled port one to the fibre carrying inbound traffic signals, port two to the other end of the optical fibre of the respective optical coupling means and port three to the continuation of the fibre carrying inbound traffic signals.

19. A network as claimed in claim 2, wherein the first and second optical coupling means each comprises an optical fibre, two three port circulators and a reflection filter which reflects the test signal wavelength but not the traffic signals, the first three port circulator having its ports one to three in the circulating direction coupled port one to the fibre carrying outbound traffic signals from the amplifier/repeater, port two to the continuation of the fibre carrying outbound traffic signals, and port three to one end of the fibre of the respective optical coupling means, the second three port circulator having its ports one to three in the circulating direction coupled port one to the other end of the fibre of the respective optical coupling means, port two to the fibre carrying inbound traffic signals and port three to the continuation of the fibre carrying inbound traffic signals whilst the reflection filter is connected in the inbound fibre carrying inbound traffic signals prior to port one of the second three port circulator.

20. A network as claimed in claim 2, wherein the first and additional optical coupling means each communicates with the fibre carrying inbound traffic signals to the output side of its associated optical amplifier/repeater.

* * * * *

UNITED STATES PATENT AND TRADEMARK OFFICE
CERTIFICATE OF CORRECTION

PATENT NO. : 6,301,036 B1
DATED : October 9, 2001
INVENTOR(S) : Spencer

Page 1 of 1

It is certified that error appears in the above-identified patent and that said Letters Patent is hereby corrected as shown below:

Column 6,
Line 56, delete "circulator one for each" and insert -- circulator, one for each --.

Column 7,
Line 9, delete "circulator a three port" and insert -- circulator, a three port --.
Line 18, delete "fibre port two" and insert -- fibre, port two --.

Signed and Sealed this

Sixteenth Day of April, 2002

Attest:

JAMES E. ROGAN
Attesting Officer
Director of the United States Patent and Trademark Office